United States Patent [19]

Jullien

[11] Patent Number: 4,596,401
[45] Date of Patent: Jun. 24, 1986

[54] REAR INDEPENDENT WHEEL SUSPENSION SYSTEM

[75] Inventor: Michel Jullien, Voisins-le-Bretonneux, France

[73] Assignee: Regie Nationale des Usines Renault, Boulogne-Billancourt, France

[21] Appl. No.: 597,841

[22] Filed: Apr. 9, 1984

[30] Foreign Application Priority Data

Aug. 10, 1983 [FR] France ............... 83 13149

[51] Int. Cl.$^4$ .................. B60G 21/04; B60G 11/20
[52] U.S. Cl. .............................. 280/700; 267/57; 280/689; 280/721
[58] Field of Search ............... 280/700, 723, 689, 721; 267/57, 154

[56] References Cited

U.S. PATENT DOCUMENTS

| | | | |
|---|---|---|---|
| 3,337,236 | 8/1967 | Peterson | 267/57 |
| 3,402,940 | 9/1968 | Castelet | 267/57 |
| 3,430,978 | 3/1969 | Fortier | 267/57 |
| 3,556,555 | 1/1971 | Abbott | 267/57 |
| 4,152,011 | 5/1979 | Sano et al. | 267/57 |
| 4,165,098 | 8/1979 | Wagner | 280/708 |
| 4,486,030 | 12/1984 | Takata et al. | 280/689 |
| 4,521,033 | 6/1985 | Lenhard-Backhaus et al. | 280/700 |

*Primary Examiner*—Richard A. Bertsch
*Attorney, Agent, or Firm*—Oblon, Fisher, Spivak, McClelland & Maier

[57] ABSTRACT

Rear independent wheel suspension system for a motor vehicle of the drawn arm type, having a V-shaped housing (12) joining corresponding ends of the wheel arms (1, 2). The other ends of the wheel arms (1, 2) are joined to the stub axels. Two torsion bars (8, 11) are housed in the V-shaped housing (12). The torsion bars (8, 11) are joined in their middle by a shackle (10). The free ends of the torsion bars (8, 11) are joined to the body of the motor vehicle by elastic joints (7) and to the wheel arms (1, 2), respectively. The tip of the V-shaped housing (12) is situated approximately in the plane containing the wheel arms (1, 2), and the V-shaped housing (12) is oriented so that the plane containing the long axes (24) of the central ellipsis of inertia (20) of its various cross-sections meets the ground (26) along a line (25) passing at or near the point of contact of the rear wheels (3, 4) and the ground (26).

8 Claims, 3 Drawing Figures

REAR INDEPENDENT WHEEL SUSPENSION SYSTEM

BACKGROUND OF THE INVENTION

1. Field of the Invention

This invention relates to a rear independent wheel suspension system of the type having wheel arms and torsion bars.

2. Background of the Invention

Suspension systems of this general type are already known. For example, such a suspension system is described in French Pat. No. 80.15 444, filed by Regie Nationale des Usines Renault. Such suspension systems have an L-shaped housing joining corresponding ends of the wheel arms to the stub axles. The L-shaped housing is located approximately beneath the steering knuckle spindles. Two torsion bars are housed in the L-shaped housing. The torsion are joined in their middles by a connecting shackle. The free ends of the torsion bars are joined to the body of the vehicle and to the wheel arms, respectively.

This type of suspension system, while it is particularly advantageous with respect to its weight, is not entirely satisfactory in certain situations. For instance, when a front wheel drive vehicle having such a suspension system is in a sloping situation, the outside wheel in the turn undergoes a variation toward the opening, giving to the axle unit rather unfavorable oversteered characteristics.

Also, the length and the position of the legs of the L-shape housing, such as is described in the above patent, do not optimize the rigidity of gripping and of opening of the axle due to a skidding force. This can be reflected in a behavior deficiency with respect to supporting and longitudinal guiding of the vehicle when turning and therefore of keeping on course.

OBJECTS AND ADVANTAGES OF THE INVENTION

The rear independent wheel suspension system according to the subject invention has as its object to eliminate or ameliorate the above drawbacks.

The subject invention thus has the advanatage of possessing a geometry particularly suited to the proper characteristics of the front axle unit and of the overall vehicle (weight, inertia, wheelbase, etc.). For instance, in a front wheel drive vehicle having a front axle unit of the oversteered, or slightly understeered, MacPherson type, in order to make the vehicle understeered overall, thus optimizing its road characteristics, the vehicle must be provided with a rear axle unit having an understeered geometry. The subject invention lends itself to such a design.

Another advantage of the rear axle unit according to the subject invention resides in its remarkable resistance to elastic deformations and to opening under skidding force. This advantage is obtained by a simple industrial embodiment and with the help of connections the weight of which is limited to the maximum.

SUMMARY OF THE INVENTION

The above advantages result from the replacement, in the device disclosed in French Pat. No. 80.15 444, of the L-shaped housing that joins the wheel arms, with an open V-shaped housing having slight torsion resistance, but all sections of which remain in parallel planes during the torsion movement.

The V-shaped housing of the subject invention is characterized by the length of its legs, the angle between the legs, the angular orientation of the housing, and positioning of the V-shaped housing in relation to the axes of the wheel arms.

DESCRIPTION OF THE PRESENTLY PREFERRED EMBODIMENT

Figure 1:
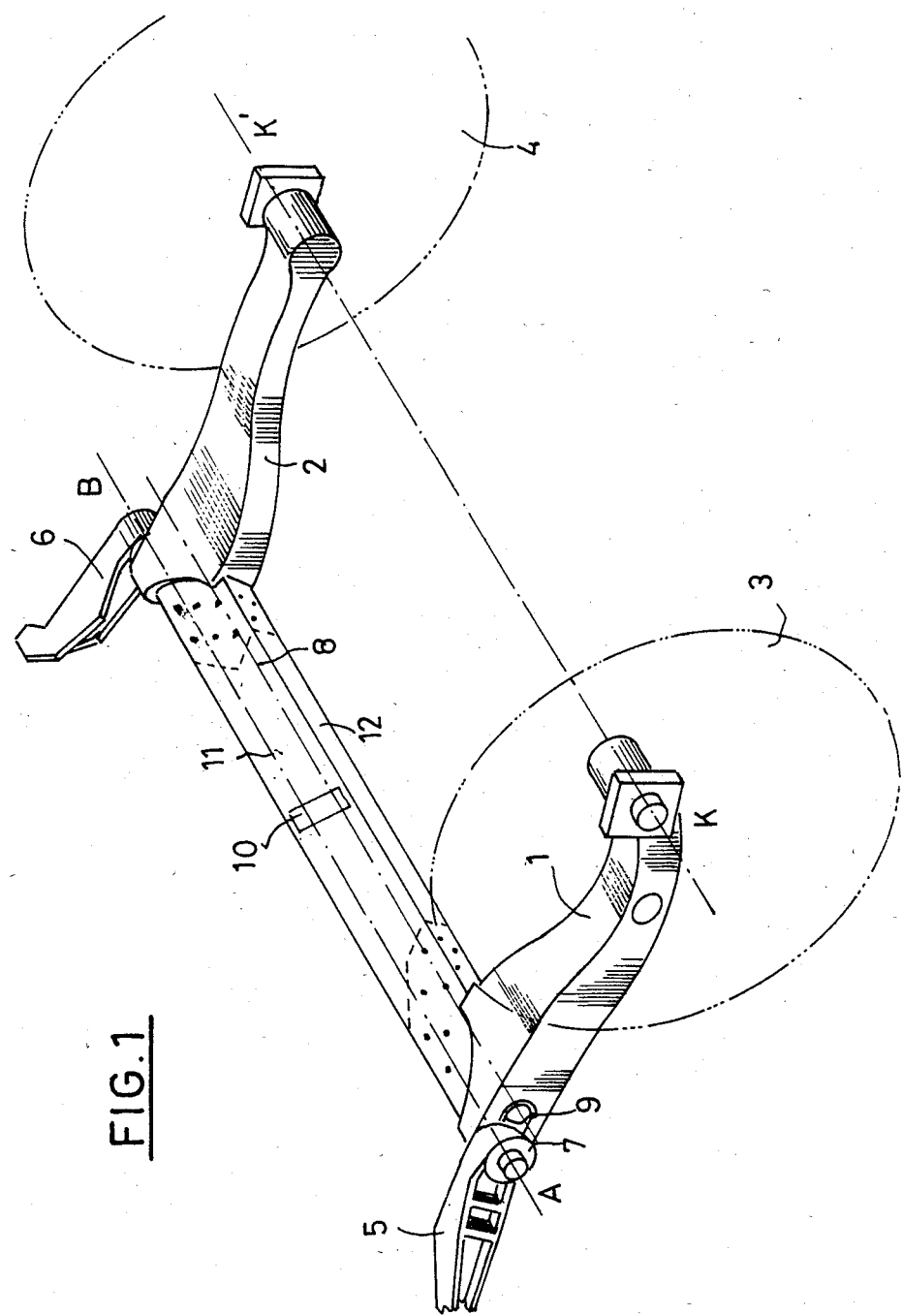
FIG. 1 is a somewhat schematic view in perspective of a rear wheel axle unit.

With reference to FIG. 1, it is seen that the rear axle unit according to the subject invention comprises wheel arms 1 and 2 supporting wheels 3 and 4. The wheel arms 1 and 2 are fastened at one end to lateral bearings fixedly attached to the body of the vehicle by elastic joints 7.

Wheel arms 1 and 2 are connected to one another by a first torsion bar 8 the ends 9 of which are fixedly attached to the wheel arms 1 and 2. A shackle 10 joins the middle part of the first torsion bar 8 to the middle part of a second bar 11 which is anchored to lateral bearings, or supports, 5 and 6. A V-shaped housing 12 is fastened at its ends to wheel arms 1 and 2. The V-shaped housing 12 covers and surrounds the first and second bars 8 and 11.

Figure 2:
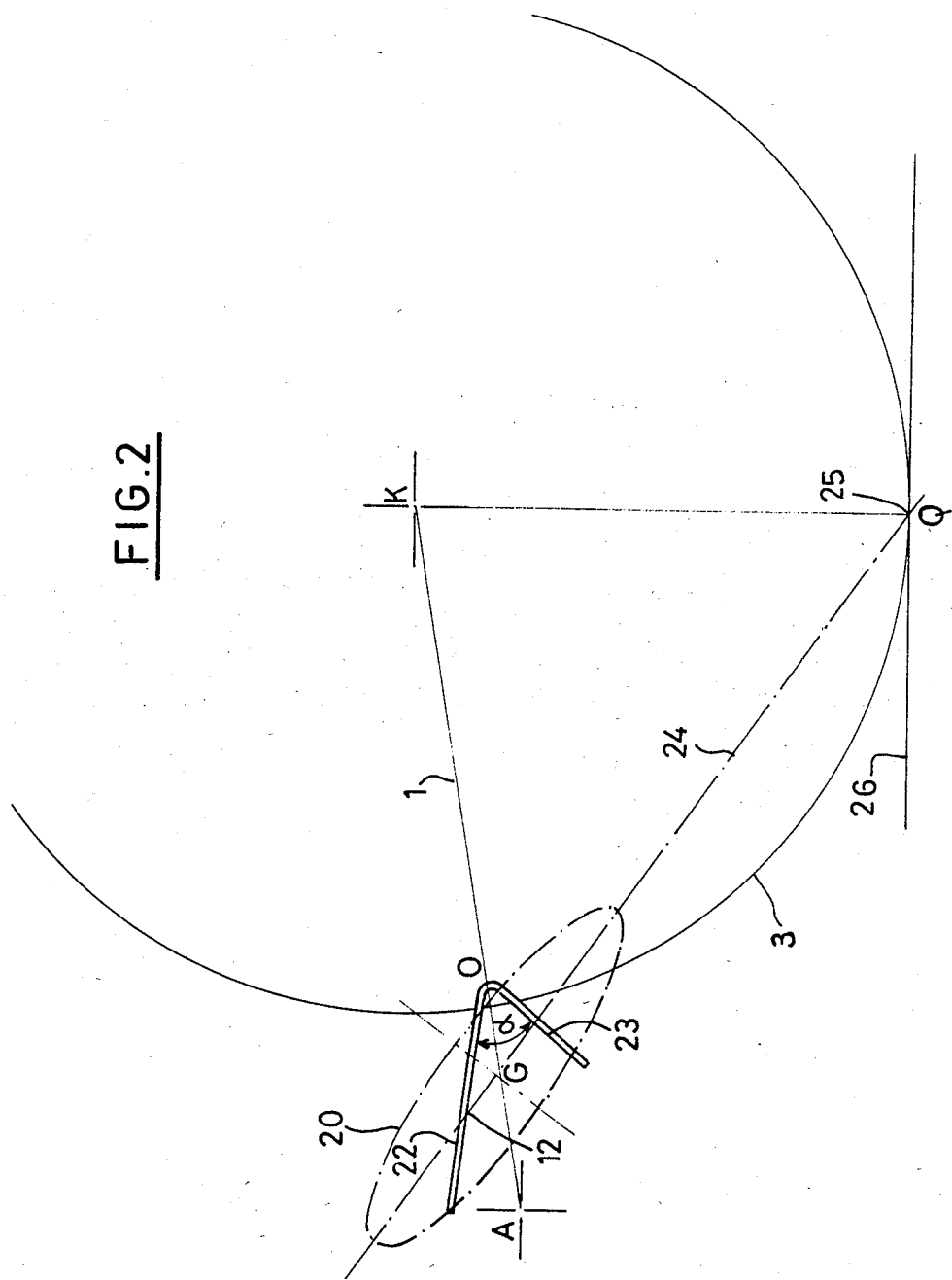
FIG. 2 is a diagrammatic side view, showing the theoretical arrangement of some of the elements of the invention.

The orientation and the positioning of the V-shaped housing 12, which are fundamental to the subject invention, are diagrammed in FIG. 2. As shown in that figure, the wheel arm 1 supports the supporting wheel 3 at point K and turns around point A, which is on the axes of rotation of the second torsion bar 11. The point of contact of the supporting wheel 3 with the ground 26 is at Q. The positioning of the rear edge O of the V-shaped housing 12 is approximately in the plane determined by the wheel arms 1 and 2.

With reference to the orientation of the V-shaped housing 12, its central ellipsis of inertia 20 (outlined in FIG. 2 for a cross section of the V-shaped housing 12) is perpendicular both to axis 21 from its folding and to the surfaces of its legs 22 and 23. The long axes 24 of the central ellipsis of inertia 20 of the section shown in FIG. 2 meets the ground at a point 25. The V-shaped housing 12 is correctly positioned according to the invention when the plane containing the long axes 24 of the central ellipsis of inertia 20 of the various cross sections of the V-shaped housing 12 meet the ground 26 along a line including the point 25 and passing approximately through points Q of contact of the supporting wheels 3 and 4 with the ground 26. This particular arrangement provides the axle unit with a great derivative rigidity. Moreover, it does so with an optimized housing of slight thickness and therefor of slight weight. Similarly, the camber or counter-camber resistance to transverse forces remains at a remarkably high level.

Naturally, the geometric and mechanical parameters of the V-shaped housing 12 are variable according to the dimensions and weight of the vehicle under consideration. The resistance characteristics of the usual materials for such housing combined with the preceeding conditions of positioning and orientation of the V- shaped housing 12, as a function of the specific positioning of the large axes of the central ellipsis of inertia 20 of the V-shaped housing 12, make possible the determination of the corresponding thickness of the sheet metal from which the V-shaped housing is made, the dimensions of legs 22 and 23, and the angle α between the legs 22 and 23.

By way of example, a V-shaped housing 12 intended for the rear suspension system of a medium range vehicle can have the following characteristics:
sheet thickness HSLA = 3 mm
distance from tip O of the V-shaped housing to the axes of rotation A = 125 mm
total length of the wheel arms = 360 mm
radius of the wheel = 258 mm
length of leg 22 = 125 mm
length of leg 23 = 74 mm
angle α = 57° 30'
slope of the arm 22 in relation to the line connecting points A and K = 17°

With the above configuration, the line of the plane containing the large axis of the central ellipsis of inertia 20 of each section of the V-shaped housing 12 effectively cuts the plane of the road along a straight line situated in the viciney of point Q under all driving circumstances.

Figure 3:
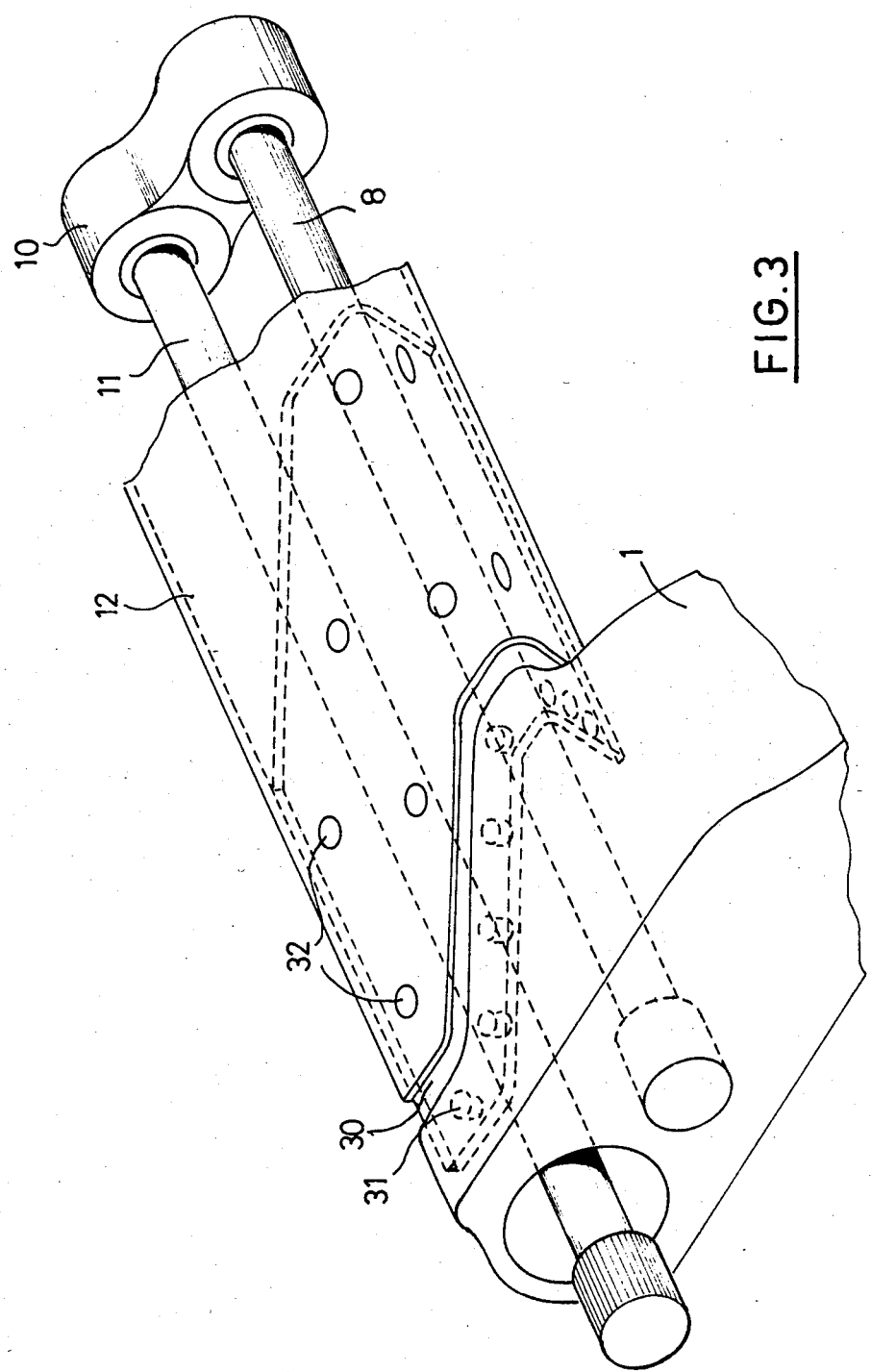
FIG. 3 is a view in perspective showing details of a practical embodiment of the invention.

A method of fastening the V-shaped housing 12 to the wheel arms 1 and 2 is illustrated in detail in FIG. 3. The wheel arms 1 and 2 are preferably cast in one piece which is attached to a V-shaped element 30 of slight length in the direction of the first and second torsion bars 8 and 11. After adequate positioning, the V-shaped element 30 is perpendicularly inserted into one of the wheel arms 1 and 2 and made solid with it during its molding by means of inclusions 31 which pass through the associated one of the wheel arms 1 and 2. On the V-shaped element 30 rests the ends of the V-shaped housing 12, which is fastened to the V-shaped element 30 by welding spots 32 or by welding beads (not shown).

The first and second torsion bars 8 and 11 of FIG. 1 act both as suspension and as anti-sloping bars. As previously stated, they are joined in their middle by shackle 10, and they are connected at their ends respectively to the wheel arms 1 and 2 and to the lateral bearings 5 and 6.

The damping, not shown, is obtained by any appropriate means, such as telescopic shock absorbers the lower parts of which rest on the ends of the wheel arms 1 and 2 near the wheel axes. The shock absorber can be horizontal or vertical, and they can be hydraulic or gas. Moreover, it would not be going outside the scope of this invention to use helical springs as suspension means in place of the illustrated cylindrical torsion bars, and the term "torsion bars" in the claims is intended to include such a construction. Similarly, it would not be going outside the scope of this invention to use wheel arms fabricated from sheet metal or from tube instead of from cast iron.

What is claimed as new and is intended to be secured by Letters Patent is:

1. A rear independent suspension system for a motor vehicle, said suspension system comprising:
   (a) at least two laterally spaced wheels mounted on stub axels;
   (b) two parallel wheel arms, one of which is connected to each of said stub axels and which projects therefrom perpendicularly to said stub axels;
   (c) a first torsion bar the ends of which are fixedly attached to said wheel arms;
   (d) a second torsion bar parallel to but spaced from said first torsion bar, said second torsion bar being anchored at either end to lateral bearings in the body of the motor vehicle;
   (e) a shackle joining said first and second torsion bars at their mid-portions; and
   (f) a V-shaped housing having two legs joined at an edge, said V-shaped housing surrounding said first and second torsion bars and being connected at either end to said wheel arms, the edge of said V-shaped housing being situated at least approximately in the plane containing said two parallel wheel arms, said V-shaped housing being oriented so that, when the suspension system is in use, the plane containing the large axes of the central ellipsis of inertia of the various cross-sections of said V-shaped housing meet the ground along a line that passes at or near the points of contact of said wheels and the ground.

2. A rear independent wheel suspension system as recited in claim 1 wherein each of said wheel arms is cast in one piece and attached to a V-shaped element in the direction parallel to said first and second torsion bars.

3. A rear independent wheel suspension system as recited in claim 2 wherein said wheel arms are attached to said V-shaped element by means of casting inclusions that pass through openings in said V-shaped elements.

4. A rear independent wheel suspension system as recited in claim 3 wherein said V-shaped housing is positioned so that its ends cover said V-shaped elements and said V-shaped housing is attached to said V-shaped elements.

5. A rear independent wheel suspension system as recited in claim 4 wherein said V-shaped housing is attached to said V-shaped elements by welding.

6. A rear independent wheel suspension system as recited in claim 2 wherein said V-shaped housing is positioned so that its ends cover said V-shaped elements and said V-shaped housing is attached to said V-shaped elements.

7. A rear independent wheel suspension system as recited in claim 6 wherein said V-shaped housing is attached to said V-shaped elements by welding.

8. A rear independent wheel suspension system as recited in claim 1 wherein said torsion bars are cylindrical in shape.

* * * * *